United States Patent
Jung (10) Patent No.: US 9,815,442 B2
(45) Date of Patent: Nov. 14, 2017

(54) ADVANCED EMERGENCY BRAKE SYSTEM AND METHOD FOR CONTROLLING BRAKE THEREOF

(71) Applicant: MANDO CORPORATION, Pyeongtaek-si, Gyeonggi-do (KR)

(72) Inventor: Soo Myung Jung, Seoul (KR)

(73) Assignee: MANDO CORPORATION, Pyeongtaek-si (KR)

( * ) Notice: Subject to any disclaimer, the term of this patent is extended or adjusted under 35 U.S.C. 154(b) by 30 days.

(21) Appl. No.: 15/044,755

(22) Filed: Feb. 16, 2016

(65) Prior Publication Data
US 2016/0236660 A1 Aug. 18, 2016

(30) Foreign Application Priority Data
Feb. 16, 2015 (KR) .................. 10-2015-0023335

(51) Int. Cl.
*B60T 7/22* (2006.01)
*B60T 8/171* (2006.01)
*B60T 8/1755* (2006.01)

(52) U.S. Cl.
CPC .............. *B60T 7/22* (2013.01); *B60T 8/171* (2013.01); *B60T 8/17558* (2013.01); *B60T 2201/022* (2013.01)

(58) Field of Classification Search
CPC .. B60T 7/22; B60T 2201/022; B60T 8/17558; B60T 8/171
USPC ........................................................ 701/70
See application file for complete search history.

(56) References Cited

U.S. PATENT DOCUMENTS

| 8,942,904 B2* | 1/2015 | Foerster | B60T 7/22 180/282 |
| 9,315,176 B2* | 4/2016 | Ando | B60T 7/22 |
| 9,682,689 B2* | 6/2017 | Parker | B60T 7/22 |
| 9,701,307 B1* | 7/2017 | Newman | B60W 30/09 |
| 2004/0085197 A1* | 5/2004 | Watanabe | B60T 7/22 340/435 |
| 2013/0158852 A1* | 6/2013 | Stahlin | G06K 9/6289 701/301 |
| 2013/0166150 A1* | 6/2013 | Han | B60W 10/18 701/42 |
| 2013/0297168 A1* | 11/2013 | Svensson | B60T 8/1755 701/70 |

(Continued)

FOREIGN PATENT DOCUMENTS

| KR | 19950017496 A | 7/1995 |
| KR | 1998039052 U | 9/1998 |

*Primary Examiner* — Atul Trivedi
(74) *Attorney, Agent, or Firm* — Hauptman Ham, LLP (57) ABSTRACT

Disclosed is an advanced emergency brake system that performs an emergency brake if a target is situated at a location close to a vehicle. The emergency brake system includes a radar sensor; a camera; an ultrasonic sensor for detecting an object situated at a close distance from the vehicle; and an electronic control unit that outputs a predetermined alarm control signal or performs an emergency brake depending on the input from the radar sensor, the camera, and the ultrasonic sensor. The emergency brake system disclosed herein can perform emergency brakes even when a target outside the angle of view of the radar sensor or the camera abruptly intervenes. Also disclosed is a method for controlling a brake with the emergency brake system.

11 Claims, 8 Drawing Sheets

(56) References Cited

U.S. PATENT DOCUMENTS

| | | | |
|---|---|---|---|
| 2014/0032093 A1* | 1/2014 | Mills | B60W 40/107 |
| | | | 701/301 |
| 2014/0339889 A1* | 11/2014 | Mizoguchi | B60T 7/22 |
| | | | 303/9.62 |
| 2014/0379233 A1* | 12/2014 | Chundrlik, Jr. | B60T 8/171 |
| | | | 701/70 |
| 2015/0274145 A1* | 10/2015 | Ando | B60T 7/22 |
| | | | 701/70 |
| 2016/0016560 A1* | 1/2016 | Parker | B60W 30/09 |
| | | | 701/70 |
| 2016/0082935 A1* | 3/2016 | Kim | B60R 16/0233 |
| | | | 701/70 |
| 2016/0339959 A1* | 11/2016 | Lee | B62D 15/0265 |

\* cited by examiner

ADVANCED EMERGENCY BRAKE SYSTEM AND METHOD FOR CONTROLLING BRAKE THEREOF

CROSS-REFERENCE TO RELATED APPLICATION

This application claims priority from and the benefit under 35 U.S.C. §119(a) of Korean Patent Application No. 10-2015-0023335, filed on Feb. 16, 2015, which is hereby incorporated by reference for all purposes as if fully set forth herein.

BACKGROUND OF THE INVENTION

1. Field of the Invention

The present invention relates to an advanced emergency brake system and a method for controlling a brake thereof, and more particularly to an advanced emergency brake system that can perform an emergency brake even when a target that deviates from the angle of view of a radar sensor or the angle of view of a camera abruptly intervenes, and a method for controlling a brake thereof.

2. Description of the Prior Art

In general, a brake apparatus that functions to decelerate or stop a vehicle during the driving of the vehicle is provided for the vehicle. The brake apparatus includes: a booster that doubles the foot effort of a brake pedal by using a vacuum pressure (engine suction pressure) generated by the power of an engine; a master cylinder that forms a brake oil pressure in a brake circuit according to the pressure doubled by the booster; and a wheel cylinder that decelerates or stops the rotational speed of a wheel according to the brake oil pressure. Here, the boosters are generally classified into a vacuum type booster that uses a negative pressure of an engine intake manifold and an air type booster that uses a pressure provided from a compressor that is driven by an engine.

Because the brake apparatus starts to brake the vehicle after the driver pushes on the brake pedal regardless of the configuration thereof, there is a limit for the driver who has a limited response time.

In order to complement this problem, an advanced emergency brake system includes a radar sensor to perform an abrupt brake regardless of the braking operation of the driver based on the relative speed and the spacing distance from an object when the object appears in front of the vehicle.

Figure 1:
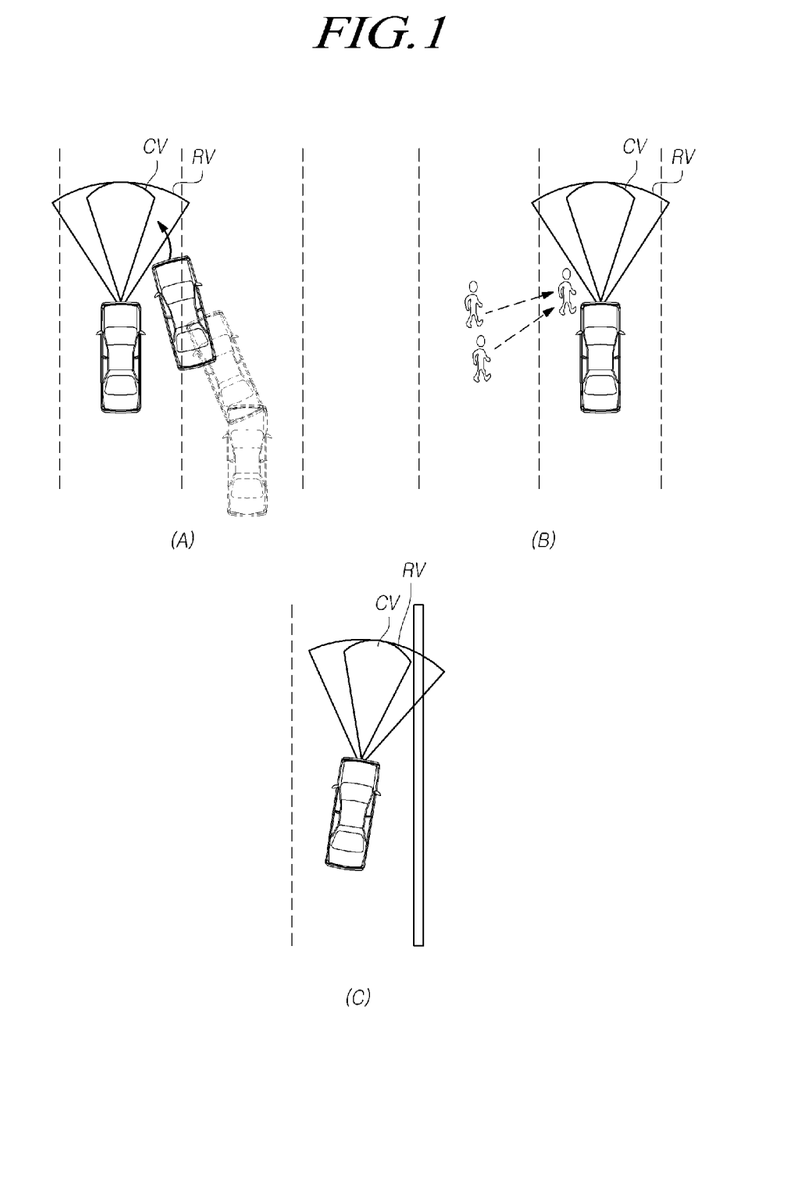
FIG. 1 is a view illustrating an advanced emergency brake system according to the related art.

However, as illustrated in FIG. 1, the advanced emergency brake system according to the related art has a limit in that an emergency brake is performed only on a front target within the angle of view (CV) of the camera and the angle of view (RV) of the radar sensor, and is not performed when a target deviating from the angle of view abruptly intervenes. Furthermore, when a guardrail is detected, a collision may occur as the system detects the guardrail late due to the limit in the angle of view. FIG. 1A illustrates that the target is a vehicle, FIG. 1B illustrates that the target is a pedestrian, and FIG. 1C illustrates that the target is a guardrail.

Accordingly, an improved advanced emergency brake system that gives an advanced alarm, after determining whether a target that travels on a lateral side of the vehicle has an intention to intervene, and if the target has an intention to intervene, performs an emergency brake if the target is present within the angle of view of the system is required.

CITATION LIST

Patent Document (Patent Document 1) (Document 1) Korean Patent Application Publication No. 1995-17496 (Jul. 20, 1995) entitled "COLLISION PREVENTING APPARATUS FOR VEHICLE USING AUTOMATIC SWITCHING OF SENSOR AND METHOD THEREOF"

(Patent Document 2) (Document 2) Korean Utility Model Application Publication No. 1998-39052 (Sep. 15, 1998) entitled "DISTANCE MEASURING APPARATUS USING ULTRASONIC SENSOR AND LASER SENSOR"

SUMMARY OF THE INVENTION

Accordingly, the present invention provides an advanced emergency brake system that gives an advanced alarm, after determining whether a target that travels on a lateral side of the vehicle has an intention to intervene, and if the target has an intention to intervene, performs an emergency brake if the target is present within the angle of view of an ultrasonic sensor and the angle of view of a radar sensor or the angle of view of a camera and the angle of view of the radar sensor, and a method for controlling a brake thereof.

In order to achieve the above object, according to an embodiment of the present invention, there is provided an advanced emergency brake system that performs an emergency brake if a target is situated at a location close to a vehicle by using a radar sensor and a camera installed in the vehicle, the advanced emergency brake system including: an ultrasonic sensor for detecting an object situated at a close distance from the vehicle; and an electronic control unit that, if determining that a distance from a target situated on a lateral side of the vehicle falls within a predetermined distance according to an acquisition signal detected by the ultrasonic sensor, outputs a predetermined alarm control signal, and if determining that the target is present within the angles of view of the ultrasonic sensor and the radar sensor or within the angles of view of the camera and the radar sensor, performs an emergency brake.

It is preferable that the electronic control unit includes: a reception unit that receives acquisition signals acquired from the radar sensor, the camera, and the ultrasonic sensor; a target recognition unit that recognizes the target situated on the lateral side of the vehicle based on the acquisition signal received from the ultrasonic sensor; an alarm generation unit that calculates a distance from the recognized target, and if the target is situated within a predetermined distance from the vehicle on the lateral side of the vehicle, primarily outputs an alarm control signal that reports a proximity alarm of the target; a determination unit that determines whether the target is present within the angles of view of the ultrasonic sensor and the radar sensor or the angles of view of the camera and the radar sensor; and a brake control unit that, if determining that the target is present within the angles of view of the ultrasonic sensor and the radar sensor or within the angles of view of the camera and the radar sensor, applying an emergency brake control signal to a brake apparatus to perform an emergency brake.

It is preferable that the electronic control unit includes: a calculation unit that calculates the distance from the target according to the acquisition signal received from the ultrasonic sensor, and the determination unit determines whether the the calculated distance from the target is smaller than a threshold value, and if the distance from the target is smaller than the threshold value, determines that the target has an intention to intervene in the driver's lane.

It is preferable that the ultrasonic sensor includes a first ultrasonic sensor situated on a side surface of the vehicle, a third ultrasonic sensor situated on a front surface of the vehicle, and a second ultrasonic sensor situated between the first ultrasonic sensor and the third ultrasonic sensor, and the electronic control unit outputs a predetermined alarm control signal if the distance from the target detected by the first ultrasonic sensor and the second ultrasonic sensor falls within a predetermined distance, outputs a predetermined alarm control signal, and if the target is present within the angles of view of the third ultrasonic sensor and the radar sensor or within the angles of view of the camera and the radar sensor, performs an emergency brake.

According to another embodiment of the present invention, there is provided a method for controlling a brake of an advanced emergency brake system that performs an emergency brake if a target is situated at a location close to a vehicle by using a radar sensor and a camera installed in the vehicle, the method including: receiving acquisition signals acquired from an ultrasonic sensor, the camera, and the radar sensor installed in the vehicle; if it is determined that the distance from the target situated on a lateral side of the vehicle according to the received acquisition signal, outputting a predetermined alarm signal; after outputting the alarm signal, determining whether the target is present within the angles of view of the ultrasonic sensor and the radar sensor or within the angles of view of the camera and the radar sensor; and if determining that the target is present within the angles of view of the ultrasonic sensor and the radar sensor or within the angles of view of the camera and the radar sensor, performing an emergency brake.

It is preferable that the method further includes: after receiving the acquisition signals, recognizing the target situated on the lateral side of the vehicle according to the acquisition signal received from the ultrasonic sensor; and calculating the distance from the recognized target in real time.

It is preferable that the method further includes: after outputting the alarm control signal, determining whether the calculated distance from the target is smaller than a threshold value, and if it is determined that the calculated distance from the target is smaller than the threshold value, determining that the target has an intention to intervene in the driver's lane.

According to an embodiment of the present invention, an advanced emergency brake system gives an advanced alarm, after determining whether a target that travels on a lateral side of the vehicle has an intention to intervene, and if the target has an intention to intervene, performs an emergency brake if the target is present within the angle of view of an ultrasonic sensor and a radar sensor or the angle of view of a camera and the angle of view of a radar sensor.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings.

Figure 2:
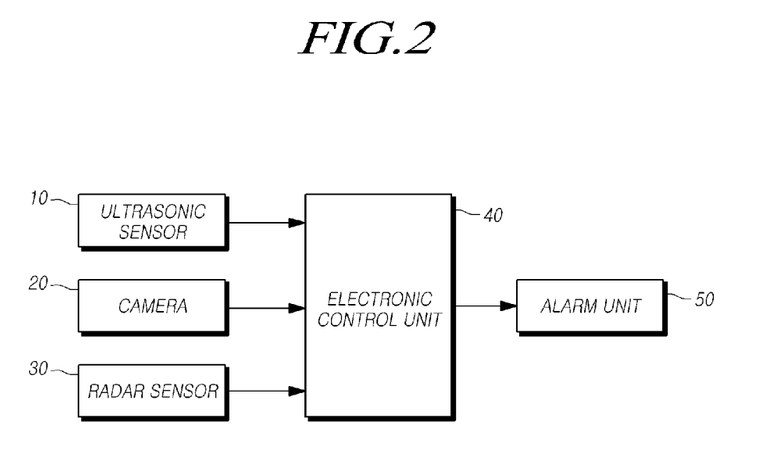
FIG. 2 is a block diagram illustrating an advanced emergency brake system according to an embodiment of the present invention.
Figure 3:
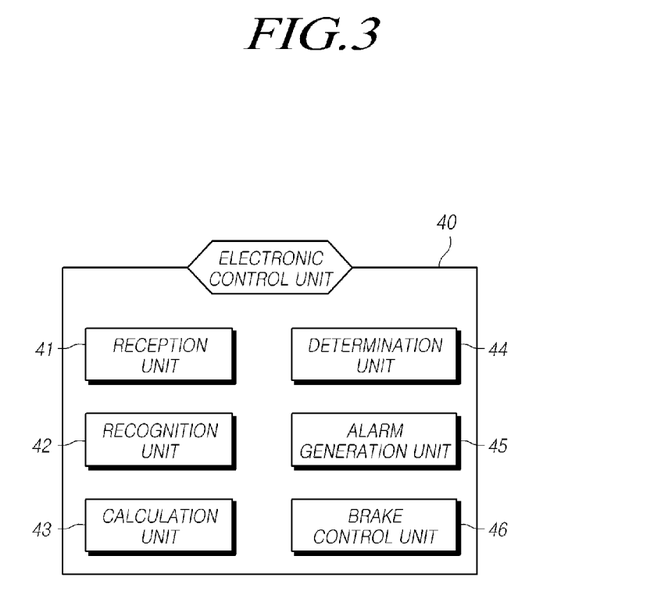
FIG. 3 is a block diagram illustrating an electronic control unit of FIG. 2.

FIG. 2 is a block diagram illustrating an advanced emergency brake system according to an embodiment of the present invention. FIG. 3 is a block diagram illustrating an electronic control unit of FIG. 2.

Referring to FIG. 2, the advanced emergency system according to the embodiment of the present invention includes an ultrasonic sensor 10, a camera 20, a radar sensor 30, and an electronic control unit 40 that performs an emergency brake when a target abruptly intervenes at a location close to the vehicle.

The ultrasonic sensor 10 is a sensor that is mounted on the front bumper of the vehicle to perform a function of detecting the distance from a target (for example, an obstacle close to the vehicle). It is used for a proximity alarm of the vehicle to prevent a collision with an obstacle (a vehicle or a pedestrian) close to the vehicle.

The ultrasonic sensor 10 may be mounted only on the front bumper of the vehicle, but a plurality of ultrasonic sensors 10 may be mounted on a front surface of the vehicle, such as the front bumper, and side surfaces of the vehicle.

For example, the ultrasonic sensor 10 may include one sensor mounted on the front surface of the vehicle and one sensor mounted on a side surface of the vehicle, and sensors may be mounted on the front surface and the side surfaces of the vehicle, and between the front surface and the side surfaces of the vehicle, respectively.

The radar sensor 30 may measure the relative speed and acceleration of the vehicle and the distance from a target (a front vehicle situated on the front side, a pedestrian situated on the front side) by using a transmission signal that is transmitted to the target and a reception signal that returns after colliding with the target.

The camera 20 may acquire a front image and detect a target based on the acquired signal.

The electronic control unit 40 may be connected to the ultrasonic sensor 10, the camera 20, and the radar sensor 30 (for example, through a LIN communication), and performs an emergency brake through the camera 20 and the radar sensor 30 if the target situated on the front side is situated in a predetermined proximity reference. The proximity reference includes a condition that satisfies at least one of a first condition in which the target is present within both of the angle of views of the ultrasonic sensor 10 and the radar sensor 30, and a second condition in which the target is present within both of the angle of views of the camera 20 and the radar sensor 30.

In particular, the electronic control unit 40 determines that a target is not situated on the front side but a target situated on a lateral side of the vehicle has an intention to intervene when the target situated on the lateral side of vehicle approaches the driver's vehicle and primarily generates an alarm when the distance between the driver's vehicle and the target falls within a predetermined distance, and if the target intervenes in the driver's lane and is present within both of the angles of view of the ultrasonic sensor 10 and the radar sensor 30 or within both of the angles of view of the radar sensor 30 and the camera 20, the electronic control unit 40 performs an emergency brake.

Referring to FIG. 3, the electronic control unit 40 includes a reception unit 41, a recognition unit 42, a calculation unit 43, a determination unit 44, an alarm generation unit 45, and a brake control unit 46.

The reception unit 41 receives acquisition signals acquired from the ultrasonic sensor 10, the camera 20, and the radar sensor 30. The reception unit 41 may receive the acquisition signals acquired from the ultrasonic sensor 10, the camera 20, and the radar sensor 30 connected through a LIN communication.

The recognition unit 42 recognizes a target based on the acquisition signal received from the reception unit 41. The target is a front vehicle situated within a predetermined interval from the front side of the vehicle, a vehicle that intervenes from a side lane, or a pedestrian that abruptly intervenes in the driver's lane.

Here, the recognition unit 42 recognizes the vehicle or pedestrian that intervenes in the drive's lane from a lateral side of the vehicle as a target based on the acquisition signal detected by the ultrasonic sensor 10. The recognition unit 42 may recognize a front vehicle situated within a predetermined interval, among the front vehicles situated on the front side of the vehicle, based on the acquisition signal detected by the radar sensor 30 as a target, but a feature of performing an emergency brake in a situation in which a target that travels on a lateral side of the driver's vehicle abruptly intervenes will be mainly described here.

The calculation unit 43 calculates the distance between the recognized target and the vehicle. That is, the calculation unit 43 calculates the distance between the vehicle and the target situated on a lateral side of the vehicle by using a transmission signal transmitted to the target through the ultrasonic sensor 10 and a reception signal reflected on the target to return.

When the calculated distance from the target becomes smaller, the determination unit 44 determines that the target has an intention to intervene in the driver's lane and determines whether the distance from the target falls within a predetermined distance.

When the distance from the target falls within the predetermined distance, the alarm generation unit 45 primarily outputs an alarm control signal that reports that the target is close to the vehicle through the alarm unit 50.

The brake control unit 46 outputs an alarm control signal through the alarm unit 50 and then determines whether the target is present within both of the angles of view of the ultrasonic sensor 10 and the radar sensor 30 or within both of the angles of view of the radar sensor 30 and the camera 20, and if a target is present, performs an emergency brake by providing an emergency brake control signal for the brake apparatus and if a target is not present, monitors the distance from targets situated on the front side and the lateral sides in real time. The angle of view of the ultrasonic sensor 10, the angle of view of the camera 20, and the angle of view of the radar sensor 30 are set to predetermined reference ranges, respectively.

In this way, the present invention can: check whether the distance from a target that travels in the side lane of the vehicle falls within a predetermined distance, primarily provide an alarm when the target falls within a predetermined distance, and secondarily perform an emergency brake if the corresponding target is present within the angle of view, thereby solving a conventional limit of not performing an emergency brake on a target that abruptly intervenes from a side lane of the vehicle.

A method for controlling a brake of the above-configured advanced emergency brake system will be described with reference to FIG. 4.

Figure 4:
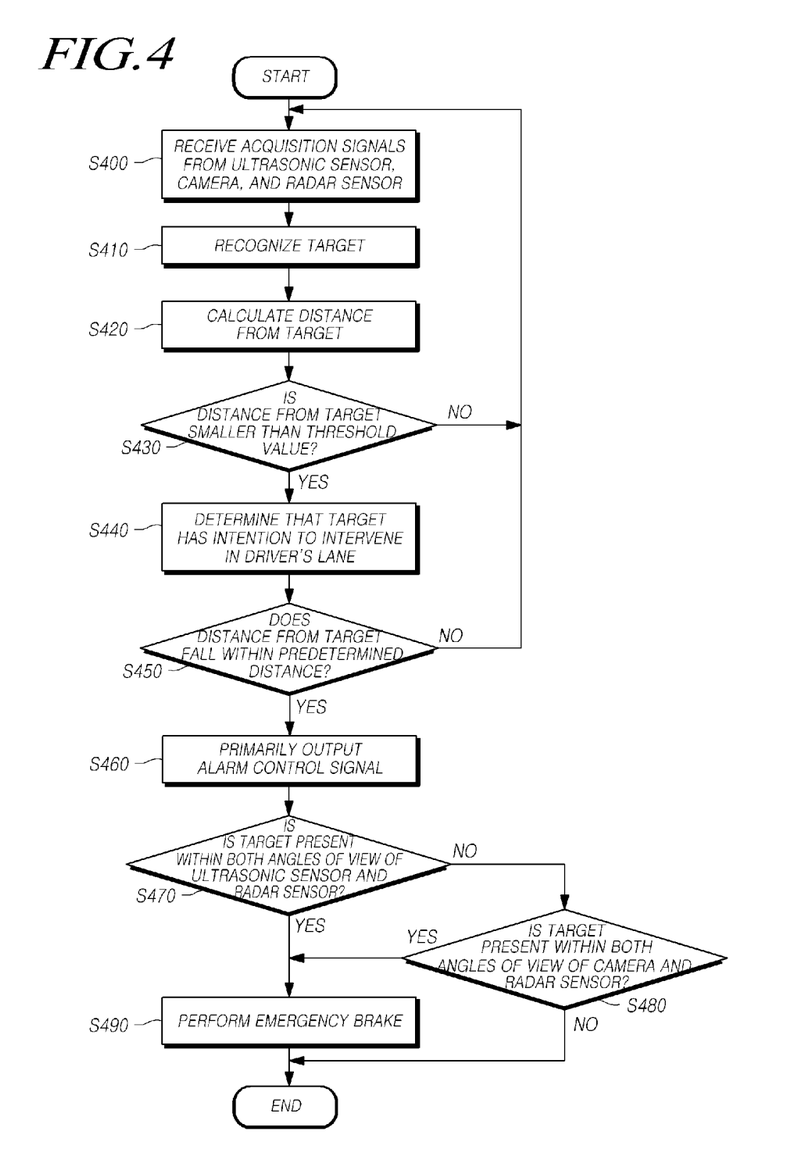
FIG. 4 is a flowchart illustrating a method for controlling a brake of the advanced emergency brake system according to the embodiment of the present invention.

FIG. 4 is a flowchart illustrating a method for controlling a brake of the advanced emergency brake system according to the embodiment of the present invention.

Referring to FIG. 4, the electronic control unit 40 receives acquisition signals acquired from the ultrasonic sensor 10, the camera 20, and the radar sensor 30 installed in the vehicle (S400).

A brake control method for selecting a target situated on the front side of the vehicle by using an acquisition signal received through the above-mentioned step S400 and performing an emergency brake when the distance from the selected target is small will not be described, and a process of performing an emergency brake when a target that travels on a lateral side of the vehicle abruptly intervenes will be described hereinbelow.

The electronic control unit 40 recognizes a target situated on a lateral side of the vehicle based on the acquisition signal received from the ultrasonic sensor 10 (S410).

The electronic control unit 40 calculates the distance from the recognized target (S420). The electronic control unit 40 may calculate the distance from the target by using a transmission signal transmitted from the ultrasonic sensor 10 to the target and a reception signal that collides with, and is reflected on, the target.

The electronic control unit 40 determines whether the calculated distance from the target is smaller than a threshold value (S430).

When it is determined in step S430 that the distance from the target is larger than the threshold value, the electronic control unit 40 determines that the target situated on a lateral side of the vehicle has no intention to intervene in the driver's lane and moves a process to the above-mentioned step S400.

When it is determined in step S430 that the distance from the target is smaller than the threshold value, the electronic control unit 40 determines that the target situated on a lateral side of the vehicle has an intention to intervene in the driver's lane (S440).

Thereafter, the electronic control unit 40 determines whether the distance from the target calculated in real time falls within the predetermined distance (S450). That is, the electronic control unit 40 determines whether the distance from the lateral target is small.

When it is determined in step S450 that the distance from the target does not fall within the predetermined distance, the electronic control unit 40 moves the process to the above-mentioned step S400 and receives the acquisition signals acquired from the ultrasonic sensor 10, the camera 20, and the radar sensor 30.

When it is determined in step S450 that the distance from the target falls within the predetermined distance, the electronic control unit 40 primarily outputs an alarm control signal, through the alarm unit 50 (S460), that reports that the target situated on a lateral side of the vehicle is close Thereafter, the electronic control unit 40 determines whether target is present within both of the angles of view of the ultrasonic sensor 10 and the radar sensor 30 (S470).

When it is determined in step S470 that the target is present within both of the angles of view of the ultrasonic sensor 10 and the radar sensor 30, the electronic control unit 40 generates an emergency brake control signal and provides the generated emergency brake control signal to the brake apparatus (not illustrated) to perform an emergency brake (S490).

When it is determined in step S470 that a target is not present within the angles of view of the ultrasonic sensor 10 and the radar sensor 30 (that is, if a target is present within neither the angle of view of the ultrasonic sensor 10 nor the angle of view of the radar sensor 30), the electronic control unit 40 determines that a target is present within both of the angles of view of the camera 20 and the radar sensor 30 (S480).

When it is determined in step S480 that a target is not present within both of the angles of the camera 20 and the radar sensor 30, the electronic control unit 40 moves the process to step S490 to perform an emergency brake.

When it is determined in step S480 that a target is present within both of the angles of view of the camera 20 and the radar sensor 30, the electronic control unit 40 terminates the process. Here, although it is described that the process is terminated, the process is moved to step S400 before the engine is turned off so that the acquisition signals acquired from the ultrasonic sensor 10, the camera 20, and the radar sensor 30 are received in a travel environment.

Figure 5:
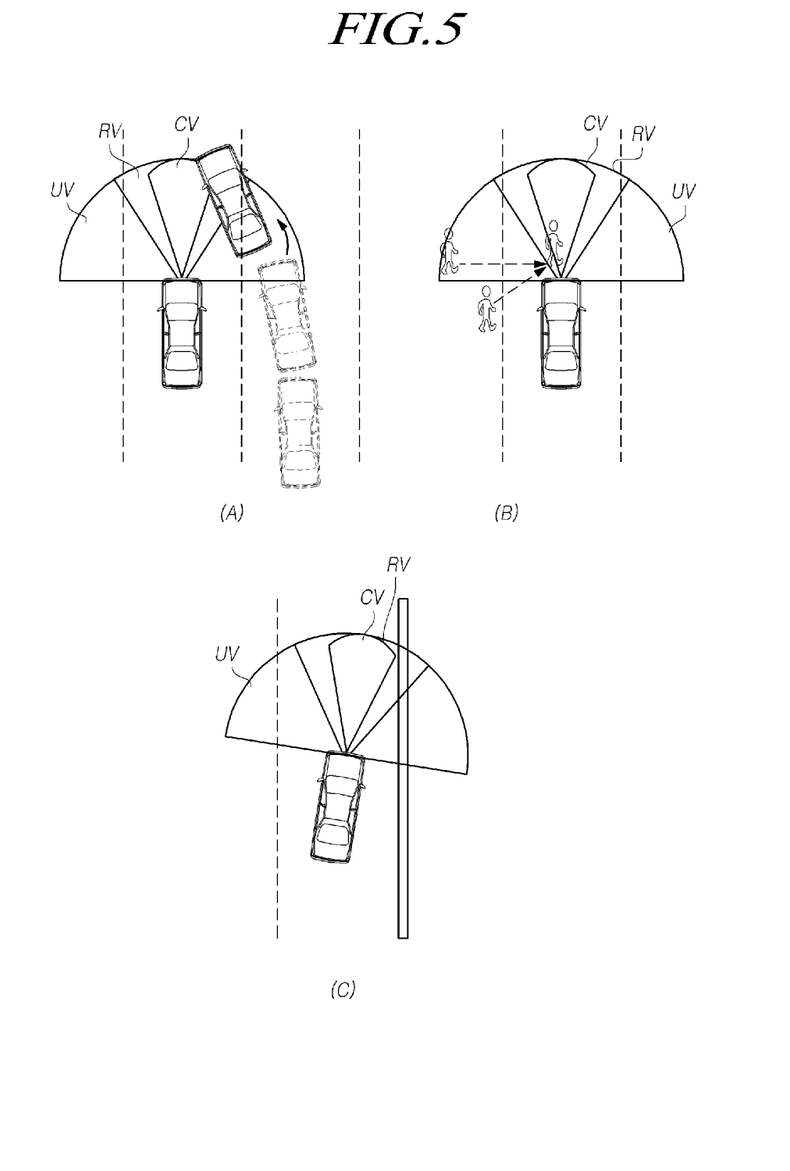
FIG. 5 is a view illustrating an environment in which the advanced emergency brake system according to the embodiment of the present invention is applied to perform an emergency brake on a target that intervenes in the driver's lane from a lateral side of the vehicle.

FIG. 5 illustrates an environment in which a target intervenes in the driver's lane from a surrounding lane, and FIG. 5A illustrates that a target (that is, a vehicle) situated in a surrounding lane intervenes in the driver's lane such that the target is present within both of the angle of view (UV) of the ultrasonic sensor and the angle of view (RV) of the radar sensor, and is also present within both the angle of view (CV) of the camera and the angle of view (RV) of the radar sensor. FIG. 5B illustrates a target (that is, a pedestrian) situated around the driver's vehicle intervenes in the driver's lane such that the target is present within both the angle of view (UV) of the ultrasonic sensor and the angle of view (RV) of the radar sensor, and is also present within both the angle of view (CV) of the camera and the angle of view (RV) of the radar sensor. FIG. 5C illustrates that a guardrail situated around the driver's vehicle is present within both the angle of view (UV) of the ultrasonic sensor and the angle of view (RV) of the radar sensor.

FIG. 5 illustrates that a target is present within both the angle of view (UV) of the ultrasonic sensor and the angle of view (RV) of the radar sensor, and is also present within both the angle of view (CV) of the camera and the angle of view (RV) of the radar sensor. An emergency brake may be performed as long as the target is present within both the angle of view (UV) of the ultrasonic sensor and the angle of view (RV) of the radar sensor, or within both the angle of view (CV) of the camera and the angle of view (RV) of the radar sensor.

By doing this, after it is determined whether a distance from a target that travels in a neighboring lane of the vehicle falls within a predetermined distance, an alarm that reports that the vehicle in the neighboring lane is at a close location is provided if the distance from the target falls within a predetermined distance, and an emergency brake may be performed on the target if the target is present within both the angles of view of the ultrasonic sensor 10 and the radar sensor 30, or within both the angles of the camera 20 and the radar sensor 30.

Figure 6:
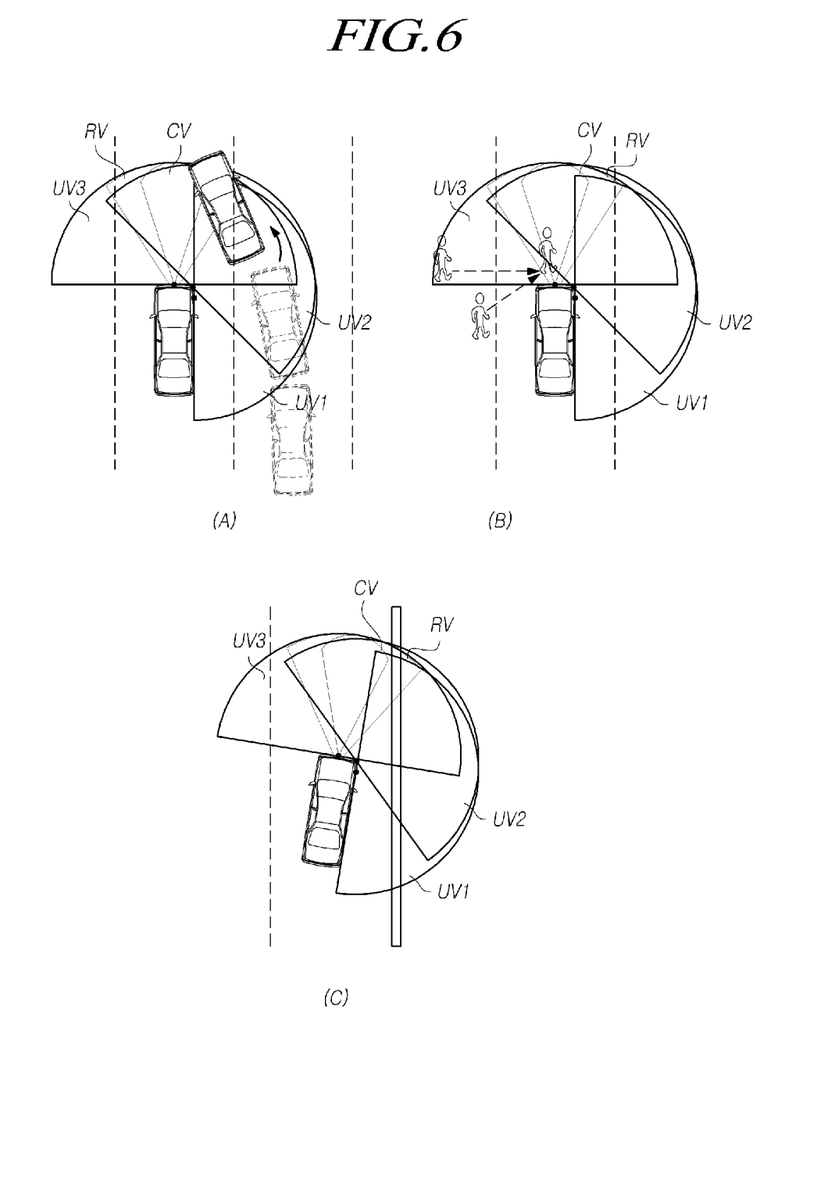
FIG. 6 is a view illustrating an embodiment in which a plurality of ultrasonic sensors are applied to the advanced emergency brake system according to the embodiment of the present invention.

FIG. 6 illustrates an environment in which a target intervenes in the driver's lane from a surrounding lane when the emergency brake system, according to the embodiment of the present invention, includes a plurality of ultrasonic sensors 10.

Referring to FIG. 6, in the advanced emergency brake system according to the embodiment of the present invention, the ultrasonic sensor 10 may include: a first ultrasonic sensor situated on a side surface of the vehicle; a third ultrasonic sensor situated on a front surface of the vehicle; and a second ultrasonic sensor situated between the first ultrasonic sensor and the third ultrasonic sensor.

The reception unit 41 receives acquisition signals acquired from the first ultrasonic sensor, the second ultrasonic sensor, and the third ultrasonic sensor, and the recognition unit 42 recognizes a target based on the acquisition signal received from the reception unit 41.

For example, the recognition unit 42 recognizes the vehicle or pedestrian that intervenes in the drive's lane from a lateral side of the vehicle based on the acquisition signal detected by the first ultrasonic sensor situated on the side surface of the vehicle. The recognition sensor may recognize a target based on the acquisition signals detected by the first ultrasonic sensor and the second ultrasonic sensor.

In order to calculate the distance between the recognized target and the vehicle, if a target simultaneously detected by the first ultrasonic sensor and the second ultrasonic sensor is recognized, the calculation unit 43 calculates a distance from the detected target.

That is, a target that approaches the vehicle from a lateral side of the vehicle is detected based on the acquisition signal detected by the first ultrasonic sensor, and if the first ultrasonic sensor and the second ultrasonic sensor detect a target, a distance from the target is calculated.

Thereafter, if the distance from the target is calculated by the calculation unit 43, the determination unit 44 determines whether the distance from the corresponding target falls within a predetermined distance, and the alarm generation unit 45 primarily outputs an alarm control signal that reports that the target is close through the alarm unit 50 if the distance from the target falls within the predetermined distance.

Accordingly, the advanced emergency brake system detects a target with the first ultrasonic sensor and the second ultrasonic sensor and primarily outputs an alarm control signal if the distance from the target falls within a predetermined distance.

The brake control unit 46 outputs an alarm control signal through the alarm unit 50, and determines whether the target is present within both the angles of view of the third ultrasonic sensor situated on the front surface of the vehicle and the radar sensor 30, or within both of the angles of view of the radar sensor 30 and the camera 20 in order to perform an emergency brake by providing an emergency brake control signal for the brake apparatus when the target is present.

Further, when a target is not present within the angles of view, distances from targets situated on the front side and lateral sides are monitored in real time and an emergency brake of the vehicle is performed when a target that approaches the vehicle from a side is present.

Figure 7:
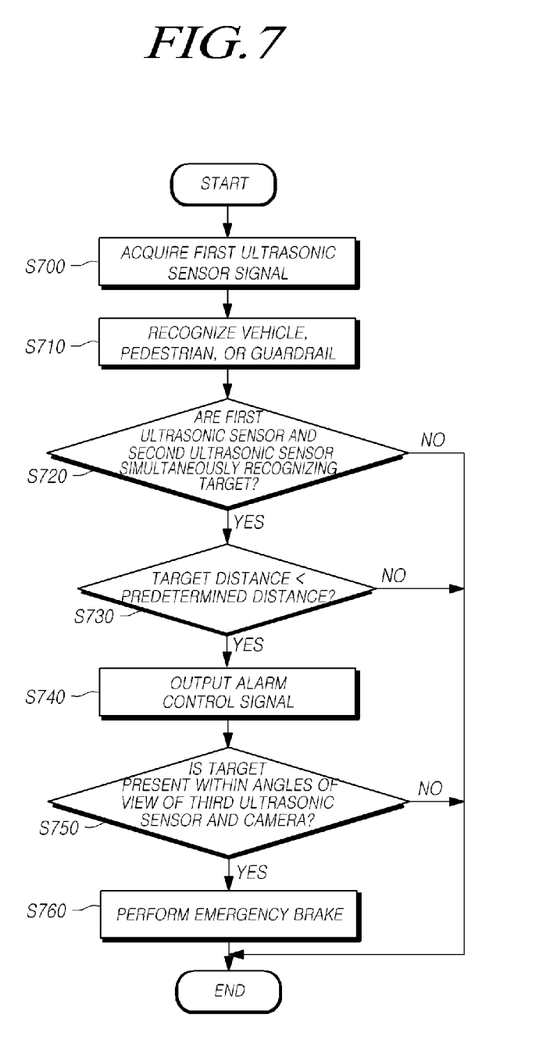
FIG. 7 is a flowchart illustrating a method for controlling a brake of an advanced emergency brake system according to another embodiment of the present invention.

In this way, the present invention can: check whether the distance from a target that travels in the side lane of the vehicle by using the first ultrasonic sensor situated on a side surface of the vehicle and the second ultrasonic sensor situated between the side surface and the front surface of the vehicle, primarily provide an alarm when the target falls within a predetermined distance, and secondarily perform an emergency brake if the corresponding target is present within the angle of view, thereby solving a conventional limit of not performing an emergency brake on a target that abruptly intervenes from a side lane of the vehicle FIG. 7 illustrates a flowchart illustrating another embodiment of the method for controlling a brake of the advanced emergency brake system according to the embodiment of the present invention, and illustrates a process of the brake control method when a plurality of ultrasonic sensors 10 are mounted on the advanced emergency brake system based on the camera 20.

Referring to FIG. 7, the electronic control unit 40 receives acquisition signals acquired from the plurality of ultrasonic sensors 10 and the camera 20 installed in the vehicle (S700).

The electronic control unit 40 receives an acquisition signal acquired from the first ultrasonic sensor mounted on a side surface of the vehicle to recognize a pedestrian or a guardrail situated on a lateral side of the vehicle (S710).

The electronic control unit 40 recognizes a target situated on a side surface of the vehicle with the first ultrasonic sensor, and if it is recognized that the target is simultaneously detected by the acquisition signal acquired from the first ultrasonic sensor and the second ultrasonic sensor situated between the front surface and the side surface of the vehicle (S720), determines whether the distance from the target falls within a predetermined distance by calculating the distance from the target (S730).

If it is determined in step S730 that the calculated distance from the target falls within a predetermined distance, the electronic control unit 40 outputs an alarm control signal (S740).

Thereafter, it is determined that a target is present within the angles of view of the third ultrasonic sensor situated on the front surface of the vehicle and the camera 20 (S750).

When it is determined in step S750 that the target is present within the angles of view of the third ultrasonic sensor and the camera 20, the electronic control unit 40 performs an emergency brake of the vehicle by generating an emergency brake control signal and providing the generated emergency brake control signal for the brake apparatus (S760).

When it is determined in step S750 that a target is present within neither the angle of view of the third ultrasonic sensor and the angle of view of the camera 20, the electronic control unit 40 terminates the process, and moves the process to step S700 before the engine is turned off to receive the acquisition signals acquired from the plurality of ultrasonic sensors 10 and the camera in a travel environment.

Figure 8:
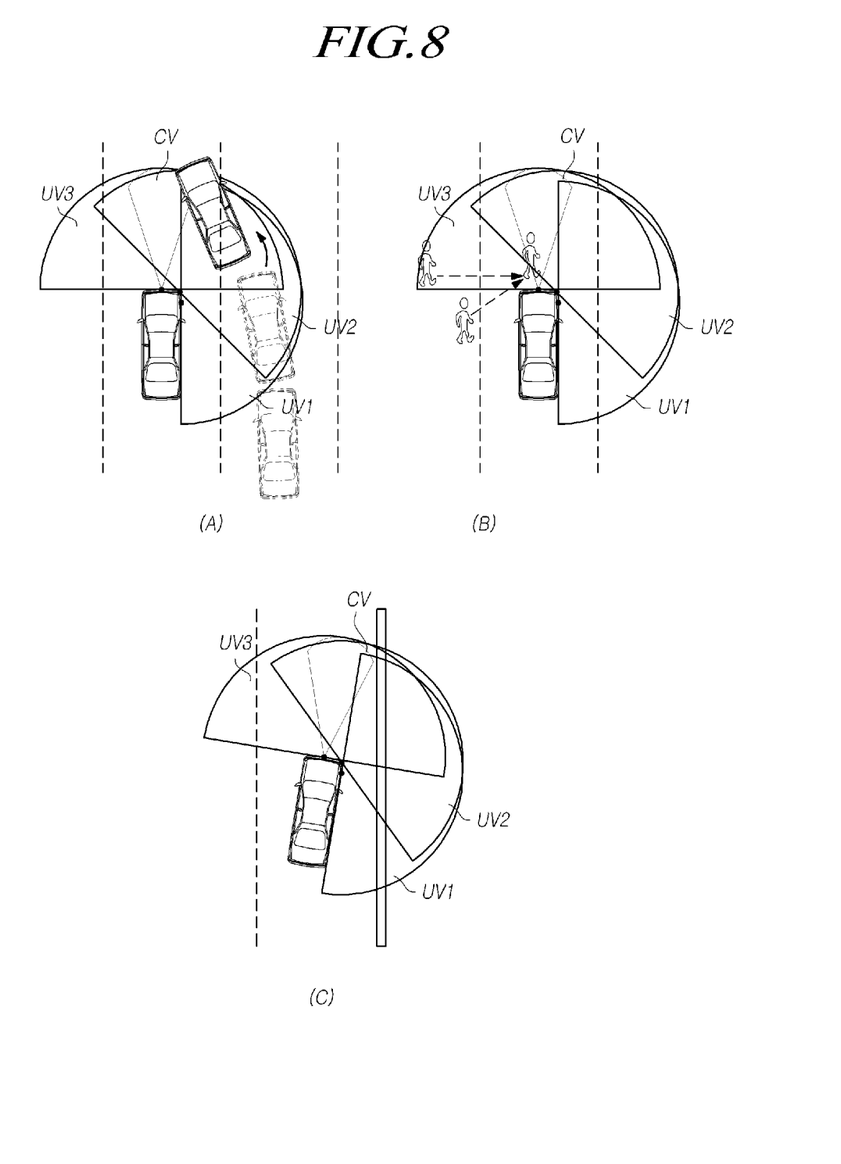
FIG. 8 is a view illustrating another example of an environment in which the advanced emergency brake system according to the embodiment of the present invention is applied to perform an emergency brake on a target that intervenes in the driver's lane from a lateral side of the vehicle.

FIG. 8 illustrates an environment in which a target intervenes from a surrounding lane of a vehicle to which the emergency brake system is applied, based on the camera 20 and the plurality of ultrasonic sensors 10 according to the embodiment of the present invention.

FIG. 8A illustrates that a target (that is, a vehicle) situated in a surrounding lane intervenes in the driver's lane and is present within both of the angle of view (UV3) of the third ultrasonic sensor and the angle of view (CV) of the camera. FIG. 8B illustrates that a target (that is, a pedestrian) situated around the driver's vehicle intervenes in the driver's lane and is present within both of the angle of view (UV3) of the third ultrasonic sensor and the angle of view (CV) of the camera. FIG. 8C illustrates that a guardrail situated around the driver's vehicle is present within both of the angle of view (UV1) of the first ultrasonic sensor and the angle of view (UV2) of the second ultrasonic sensor.

As illustrated in FIGS. 8A and 8B, a target that is present within the angle of view (UV1) of the first ultrasonic sensor situated on a side surface of the vehicle and the angle of view (UV2) of the second ultrasonic sensor situated between the front surface and the side surface of the vehicle is detected, and an alarm control signal is output if the distance from the target falls within a predetermined distance. Furthermore, if a target is present within the angle of view (UV3) of the third ultrasonic sensor situated on the front surface of the vehicle and the angle of view of the camera, a collision of the vehicle can be prevented through a control of an emergency brake even when a target that approaches the vehicle from a lateral side of the vehicle is present.

In addition, as illustrated in FIG. 8C, if the guardrail is situated on a side surface of the vehicle and is present within the angle of view (UV1) of the first ultrasonic sensor and the angle of view (UV2) of the second ultrasonic sensor, an alarm control signal is output so that a collision with the guardrail can be prevented even in the case of a late detection of the target due to the angle of view (CV) of the camera.

The present invention is not limited by the embodiments and may be variously modified and changed by those skilled in the art, and the modifications and changes are included in the purposes and range of the present invention defined by the claims.

What is claimed is:

1. An advanced emergency brake system for performing an emergency brake, the advanced emergency brake system comprising:
   a radar sensor installed in a vehicle and configured to detect an object within an angle of view of the radar sensor;
   a camera installed in the vehicle and configured to detect the object within an angle of view of the camera;
   an ultrasonic sensor installed in the vehicle and configured to detect the object within an angle of view of the ultrasonic sensor; and
   an electronic control unit connected to the radar sensor, the camera and the ultrasonic sensor, and configured to,
   when a distance from a target situated on a lateral side of the vehicle falls within a predetermined distance according to an acquisition signal detected by the ultrasonic sensor, output a predetermined alarm control signal, and
   when the target is present within the angles of view of the ultrasonic sensor and the radar sensor or within the angles of view of the camera and the radar sensor, perform the emergency brake.

2. The advanced emergency brake system of claim 1, wherein the electronic control unit comprises:
   a reception unit configured to receive acquisition signals acquired from the radar sensor, the camera, and the ultrasonic sensor;
   a target recognition unit configured to recognize the target situated on the lateral side of the vehicle based on the acquisition signal received from the ultrasonic sensor;

an alarm generation unit configured to
  calculate a distance from the recognized target, and
  when the target is situated within the predetermined distance from the vehicle on the lateral side of the vehicle, output the predetermined alarm control signal that reports a proximity alarm of the target;
a determination unit configured to determine whether the target is present within the angles of view of the ultrasonic sensor and the radar sensor or the angles of view of the camera and the radar sensor; and
a brake control unit configured to, when the target is present within the angles of view of the ultrasonic sensor and the radar sensor or within the angles of view of the camera and the radar sensor, provide an emergency brake control signal to a brake apparatus to perform the emergency brake.

3. The advanced emergency brake system of claim 2,
wherein the determination unit is configured to, when the calculated distance from the recognized target is smaller than a threshold value, determine that the recognized target has an intention to intervene in the vehicle's lane, and
wherein the alarm generation unit is configured to, when the determined target having the intention to intervene in the vehicle's lane is situated within the predetermined distance from the lateral side of the vehicle, output the alarm control signal.

4. The advanced emergency brake system of claim 1,
wherein the ultrasonic sensor comprises a first ultrasonic sensor situated on a side surface of the vehicle, a third ultrasonic sensor situated on a front surface of the vehicle, and a second ultrasonic sensor situated between the first ultrasonic sensor and the third ultrasonic sensor, and
wherein the electronic control unit is configured to,
  when a distance from the target detected by the first ultrasonic sensor and the second ultrasonic sensor falls within the predetermined distance, output the predetermined alarm control signal, and
  when target is present within the angles of view of the third ultrasonic sensor and the radar sensor or within the angles of view of the camera and the radar sensor, perform the emergency brake.

5. The advanced emergency brake system of claim 4, wherein the electronic control unit is configured to calculate the detected distance from the target when the target simultaneously detected by the first ultrasonic sensor and the second ultrasonic sensor.

6. A method for controlling a brake of an advanced emergency brake system, the method performed by a vehicle comprising an ultrasonic sensor, a radar sensor and a camera installed in the vehicle, the method comprising:
receiving acquisition signals acquired from the ultrasonic sensor, the camera, and the radar sensor;
when a distance from a target situated on a lateral side of the vehicle according to the received acquisition signal, outputting a predetermined alarm signal;
determining whether the target is present within the angles of view of the ultrasonic sensor and the radar sensor or within the angles of view of the camera and the radar sensor; and
when the target is present within the angles of view of the ultrasonic sensor and the radar sensor or within the angles of view of the camera and the radar sensor, performing an emergency brake.

7. The method of claim 6, wherein the outputting of the predetermined alarm signal comprises: recognizing the target situated on the lateral side of the vehicle according to the acquisition signal received from the ultrasonic sensor; and
  calculating the distance from the recognized target in real time.

8. The method of claim 7, wherein the outputting of the predetermined alarm signal further comprises:
determining whether the calculated distance from the recognized target is smaller than a threshold value, and
when the calculated distance from the recognized target is smaller than the threshold value, determining that the recognized target has an intention to intervene in the vehicle's lane.

9. An advanced emergency brake system for performing an emergency brake, the advanced emergency brake system comprising:
a radar sensor installed in a vehicle and configured to detect an object within an angle of view of the radar sensor;
a camera installed in the vehicle and configured to detect the object within an angle of view of the camera;
an ultrasonic sensor installed in the vehicle and configured to detect the object within an angle of view of the ultrasonic sensor; and
an electronic control unit connected to the radar sensor, the camera and the ultrasonic sensor and configured to,
when the distance from a target situated on a lateral side of the vehicle falls within a predetermined distance according to an acquisition signal detected by the ultrasonic sensor, output a predetermined alarm control signal, and
when the target is present within the angles of view of the ultrasonic sensor and the camera, perform the emergency brake.

10. The advanced emergency brake system of claim 9,
wherein the ultrasonic sensor comprises
a first ultrasonic sensor situated on a side surface of the vehicle,
a third ultrasonic sensor situated on a front surface of the vehicle, and
a second ultrasonic sensor situated between the first ultrasonic sensor and the third ultrasonic sensor, and
wherein the electronic control unit is configured to,
  when a distance from the target detected by the first ultrasonic sensor and the second ultrasonic sensor falls within the predetermined distance, output the predetermined alarm control signal, and
  when the target is present within the angles of view of the third ultrasonic sensor and the camera, perform the emergency brake.

11. The advanced emergency brake system of claim 10, wherein the electronic control unit is configured to calculate the detected distance from the target when the target simultaneously detected by the first ultrasonic sensor and the second ultrasonic sensor.

* * * * *